United States Patent [19]

Johnson

[11] 4,211,756

[45] Jul. 8, 1980

[54] SYNTHESIS OF ZEOLITE S

[75] Inventor: George C. Johnson, Princeton, N.J.

[73] Assignee: Mobil Oil Corporation, New York, N.Y.

[21] Appl. No.: 5,068

[22] Filed: Jan. 22, 1979

[51] Int. Cl.$^2$ .............................................. C01B 33/28
[52] U.S. Cl. ..................................... 423/118; 423/328
[58] Field of Search ........................ 423/118, 328–330; 252/455 Z

[56] References Cited

U.S. PATENT DOCUMENTS

| | | | |
|---|---|---|---|
| 3,054,657 | 9/1962 | Breck | 23/328 |
| 3,694,152 | 9/1972 | Sersale et al. | 423/118 |
| 3,714,366 | 1/1973 | Fukuda et al. | 423/328 |

OTHER PUBLICATIONS

Barrer et al., "J. Chemical Society", 1959, pp. 195–208.
Aiello et al., "Molecular Sieve Zeolites-I", ACS Copyright 1971, pp. 51–62.

*Primary Examiner*—Edward J. Meros
*Attorney, Agent, or Firm*—Charles A. Huggett; Raymond W. Barclay; Howard M. Fluornoy

[57] ABSTRACT

A process for making zeolite S by reacting an aqueous solution of $Na_2CO_3$ and $NaHCO_3$ with glass, e.g., Pyrex glass. The silica and alumina are furnished by slow dissolution of the glass.

4 Claims, No Drawings

SYNTHESIS OF ZEOLITE S

BACKGROUND OF THE INVENTION

1. Field of the Invention

This invention is concerned with a novel method of making Zeolite S. Zeolite S may be utilized as an adsorbent, an ion exchanger and as a catalyst.

2. Description of the Prior Art

Zeolite S is known in the art, for example, U.S. Pat. No. 3,054,657 (Breck) is to a method of synthesizing zeolite S. The preparation of Species S zeolite is also described in the literature by Barrer et al.; J. Chem. Soc., 1959A, 195. Barrer et al.'s method leads to a product which also contains zeolite P and zeolite X as impurities. Barrer et al. used colloidal silica as the source of silicon and aluminum hydroxide as the source of aluminum. Colella and Aiello, Rend. Accad. Sci. Fis. Mat., Naples 1971, Vol. 38, Page 243, used rhyolite glass as the silicon and aluminum source; the reaction took place in a non-reactive teflon container. Rhyolite is based upon and/or formed from volcanic materials. The Breck patent's source of silica and alumina was derived from sodium silicate or colloidal silica and sodium aluminate.

Zeolites are usually made by mixing silicate and aluminate solutions and heating the resulting gel-solution mixture until a complete crystallization is obtained. Zeolites have a tetrahedral framework of oxygen ions about silicon and aluminum ions with each zeolite having its particular range of silicon to aluminum ions. The silicon/aluminum ratio is a function of the composition of the reaction mixture. Accordingly variables can be introduced into or via the mixture, some of which include:

(1) $SiO_2/Al_2O_3$ ratio, (2) cations or ratio of cationic species, (3) concentration of the alkali, (4) pH, (5) seeding, (6) temperature and (7) time. Variation in the silica to alumina ratio of the starting mixture influences the type of crystal structure formed, e.g., zeolites A, B, or X. Another variable may be introduced by complexing part of the aluminum with ions other than hydroxyl.

SUMMARY OF THE INVENTION

The novel process as disclosed herein for making zeolite S comprises stirring an aqueous mixture of sodium carbonate and sodium bicarbonate with glass. The silica and alumina for the process are furnished by the slow dissolution of the glass. Applicant knows of no prior art wherein the instant method of synthesizing zeolite S is disclosed.

DESCRIPTION OF SPECIFIC EMBODIMENTS

A suitable glass is Corning Glass Works Pyrex glass which has a composition of about 81% $SiO_2$, 2% $Al_2O_3$, 13% $B_2O_3$ and 4% $Na_2O$. The glass should contain 2% or more alumina, but zeolite S can be made satisfactorily with glass containing 1 to 4% alumina. Although the process may be carried out by simply placing the reagents in a glass vessel, pulverized glass is preferable if it is desirable to speed the reaction.

The molar ratio of sodium carbonate to sodium bicarbonate may vary from 1:1 to infinity, (i.e., no sodium bicarbonate). Preferred is 1:1 to 10:1. The silica to alumina ratio generally varies from about 4 to 7 and preferentially from about 4.1 to 6.2. The reaction temperature may vary from about 80° to 120° C. Preferred is the boiling point at atmospheric pressure, about 102° C. The rate of dissolution of the glass and the rate at which the silica and alumina are thereby furnished for reaction is controlled by the glass composition, particularly its alumina content, the size of the glass particles, the temperature, the concentration of sodium carbonate, and the concentration of sodium bicarbonate. Usually the reaction time is from about 24 to 168 hours, for example, about 144 hours for large pieces of glass, about 24 hours for finely divided glass.

Some of the advantages of this method of preparation are as follows: (1) The aluminum supply can be kept at a low level when aluminum ion is supplied by dissolution of the glass at a rate equal to or less than the rate at which it can be utilized by the growing crystals. (2) Slow growth, brought about by slow supply of aluminum or other ion, produces larger crystals. This is especially true with seeded solutions, where, in favorable cases, no new crystal nuclei are formed. (3) Reactants can be supplied in the same ratio in which they are needed in the growing crystal. Narrow ranges of optimum growth conditions can be maintained, favoring growth of just one specific zeolite. (4) Metals which have relatively insoluble hydroxides, such as calcium, can be supplied to the solution by calcium-containing glass without having calcium hydroxide as an impurity in the product. (5) Some unusual components can be supplied via the glass—for example pentavalent arsenic, (one might for example make an arsenic-silicon-oxygen framework having a net positive charge and requiring a negative ion, such as hydroxyl or chloride, in the cages for charge balance ) and (6) the use of sodium bicarbonate in the synthesis embodied herein provides a buffered solution which confines hydroxyl ion concentration within a limited range as the reaction proceeds. Other buffered systems may also be used, for example phosphate has been used as a buffer.

EXAMPLE

Sodium carbonate, (53.00 g.) and sodium bicarbonate (42.00 g.) were dissolved in water (978.7 g.) to make 1000 cc. of solution. The resulting solution was poured into a clean, dry two-liter Pyrex flask. In this example the glass was supplied solely from the reactor. The mixture was stirred and heated at reflux temperature in an atmosphere of oxygen. (The use of oxygen is considered unnecessary to the zeolite S preparation.)

The reaction mixture was somewhat cloudy when examined after 7 hours. At the end of 143 hours the reaction mixture was quite cloudy. It was then cooled to 40° C. and filtered through Whatman #40 paper supported on a porcelain Buchner funnel. The solid was washed twice with water and dried in a vacuum oven at 100° C. at about 200 mm. Hg. absolute. The dry solid (I) weighed 1.48 g., Analysis: $SiO_2$ 50.55%, $Al_2O_3$ 16.72%, $Na_2O$ 9.95%, water 20.2 wt. % (thermogravimetric). Sum: 97.4%.

The sparkling clear filtrate was acidified with nitric acid. Gas ($CO_2$) bubbled out and a copious precipitate formed. The mixture was evaporated to 225 cc, cooled, and vacuum filtered as before. Filtration was rapid. The solid was a gel and wide cracks appeared in the cake as the aqueous phase drained away. After two washings with water, the solid was vacuum dried as before and solid II, 13.43 g., was recovered. In order to remove occluded salt, solid II was Soxhlet extracted with water. The extracted solid was vacuum dried as before to produce a solid III which contained ash, 91.29%; $SiO_2$ 88.51%; Na, 1.85%, and Al$_2$O$_3$, 0.06%, indicating it was predominatly silica.

Examination of an X-ray diffraction pattern of solid I showed that the main lines matched those listed in the powder diffraction file of the International Centre for Diffraction Data for Zeolite S as reported by R. M. Barrer et al. The X-ray diffraction pattern for the present preparation, together with values for Barrer S and values for d, 2θ and relative peak heights are shown in the table 1.

The X-ray diffraction pattern of the present preparation contains all of the lines for zeolite S reported by the aforementioned Barrer et al. Other lines were present, including lines corresponding to the major lines of gmelinite, a sodium/calcium zeolite, and chabazite, a calcium zeolite.

The X-ray diffraction pattern reported by the aforementioned Breck matches most of the lines reported by the others but has some significant differences. Breck's strong line (intensity 70) at 21.56° for 2θ is absent from Barrer's pattern and is much less intense, and diffuse, in other experimental patterns and the present patterns.

Zeolites, E, P, √ℓR, A, B, X—each reported in one or more of the earlier zeolite S preparations—appear to be absent here.

The elemental composition determined here may be compared with earlier compositions, as expressed in formula weights, with Al$_2$O$_3$ taken as 1.0:

|  | Na$_2$O | Al$_2$O$_3$ | SiO$_2$ | H$_2$O |
| --- | --- | --- | --- | --- |
| Barrer | 1 | (1.0) | 5.1 | 5.4 |
| Breck | 0.9 | (1.0) | 4.6 to 5.9 | 6 to 7 |
| Breck | 0.8 | (1.0) | 5.1 | 7.2 |
| Breck |  | (1.0) | 4.6 | — |
| Here | 0.98 | (1.0) | 5.13 | 6.8 |

A sample of the zeolite dried at 100° C. and 200 mm. Hg., 47.80 mg., weighed 38.15 mg. after heating to 500° C. at 30° C./min. This calculates as 25.3 wt. % water sorbed by the dry solid. Another portion, first heated to 300° C. to eliminate water, then sorbed 0.9 wt. % n-hexane at 25° C. The n-hexane was sorbed from a stream of helium saturated with n-hexane at 25° C. When heated rapidly on a spatula in a gas flame, the zeolite S intumesced in the typical zeolite fashion.

For comparison Breck found that his zeolite S sorbed 28.0 wt. % water at 25° C. (24 mm Hg.) but 1% benzene (65 mm Hg.) and 1.3% n-pentane (404 mm Hg.).

The framework of zeolite S has not been firmly established, however zeolite S has a hexagonal unit cell, is related to gmelinite and chabazite and contains non-planar 12-rings. Barrer et al. selected values of a=13.72 A and c=20.00 A for the unit cell.

It is clear to those of skill in the art that some variations of this invention may be made and are within the scope of this specification.

Table

X-Ray Diffraction Pattern

| 2θ | d, A | Relative Peak Height[a] |
| --- | --- | --- |
| 7.45 | 11.87 | 37 |
| 12.85 | 6.89 | 84 |
| 17.7 | 5.01 | 100 |
| 19.8 | 4.48 | 28 |
| 20.6[b] | 4.31 | 56 |
| 25.9 | 3.44 | 79 |
| 30.1 | 2.969 | 79 |
| 30.6 | 2.921 | 81 |
| 34.5 | 2.600 | 44 |
| 43.4 | 2.085 | 33 |
| 47.7 | 1.907 | 19 |
| 50.6 | 1.804 | 33 |
| 53.3 | 1.719 | 30 |

Siemens Kristaloflex IV generator and Siemens diffractometer. Cu K α radiation, 40 KV, 24 ma, 1°/min, 1 cm/min, 4 × 10$^4$ counts/min from 60° to 35° 1 × 10$^5$ counts/min 35° to 1°.
[a]Peaks smaller than 19 omitted.
[b]Does not match Barrer et al. Zeolite S.

What is claimed is:

1. A process for preparing crystalline aluminosilicate zeolite S comprising reacting in a suitable Pyrex flask an aqueous solution of sodium carbonate and sodium bicarbonate with glass having from about 81% SiO$_2$, about 1 to 4% alumina, about 13% B$_2$O$_3$ and about 4% Na$_2$O wherein the temperature is controlled at from about 80 to about 120° C. and the time required for synthesis varied from 24 to 168 hours and wherein the glass is supplied solely from said flask.

2. The process of claim 1 wherein the mole ratio of sodium carbonate to sodium bicarbonate is at least 1 to 1.

3. The process of claim 1 wherein said zeolite has a silica to alumina mole ratio of from 4 to about 7.

4. The process of claim 3 wherein said mole ratio is 3.

* * * * *

UNITED STATES PATENT AND TRADEMARK OFFICE
CERTIFICATE OF CORRECTION

PATENT NO. : 4,211,756
DATED : July 8, 1980
INVENTOR(S) : GEORGE C. JOHNSON

It is certified that error appears in the above-identified patent and that said Letters Patent are hereby corrected as shown below:

Column 3, line 10, after "table" delete "1".

Column 4, line 47, in Claim 4, "3" should be "5", second occurrence.

The following claim should be added:

5. The process of claim 1 wherein the molar ratio of sodium carbonate to sodium bicarbonate varies from about 1:1 to about 10:1.

On the title page, immediately following the abstract,
    "4 Claims" should read -- 5 Claims--.

Signed and Sealed this

*Seventeenth* Day of *February 1981*

[SEAL]

*Attest:*

RENE D. TEGTMEYER

*Attesting Officer*     *Acting Commissioner of Patents and Trademarks*